(12) United States Patent
DeBlock et al.

(10) Patent No.: US 11,710,818 B1
(45) Date of Patent: Jul. 25, 2023

(54) FABRICATION AND FUSION OF ZINC PARTICLES IN POROUS ELECTRODES

(71) Applicant: The Government of the United States of America, as represented by the Secretary of the Navy, Arlington, VA (US)

(72) Inventors: Ryan H. DeBlock, Alexandria, VA (US); Joseph F. Parker, Riva, MD (US); Jeffrey W. Long, Alexandria, VA (US); Debra R. Rolison, Arlington, VA (US); Christopher N. Chervin, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/154,078

(22) Filed: Jan. 13, 2023

Related U.S. Application Data

(60) Provisional application No. 63/299,071, filed on Jan. 13, 2022.

(51) Int. Cl.
  *H01M 4/24* (2006.01)
  *H01M 4/04* (2006.01)
  *H01M 4/02* (2006.01)

(52) U.S. Cl.
  CPC ......... *H01M 4/244* (2013.01); *H01M 4/0433* (2013.01); *H01M 4/0471* (2013.01); *H01M 2004/021* (2013.01)

(58) Field of Classification Search
  None
  See application file for complete search history.

(56) References Cited

U.S. PATENT DOCUMENTS

| | | | |
|---|---|---|---|
| 9,802,254 B2 | 10/2017 | Rolison et al. | |
| 10,008,711 B2 | 6/2018 | Rolison et al. | |
| 10,720,635 B2 | 7/2020 | Rolison et al. | |
| 10,763,500 B2 | 9/2020 | Parker et al. | |
| 10,804,535 B2 | 10/2020 | Parker et al. | |
| 11,069,889 B2 | 7/2021 | Hopkins et al. | |
| 11,296,373 B2 | 4/2022 | Parker et al. | |
| 2008/0014495 A1* | 1/2008 | Saito .................... | H01M 8/1011 429/535 |
| 2017/0365834 A1* | 12/2017 | Ogata ................. | H01M 50/451 |

(Continued)

OTHER PUBLICATIONS

Chamoun et al., NPG Asia Materials (2015) 7, e178.

(Continued)

*Primary Examiner* — Brian R Ohara
(74) *Attorney, Agent, or Firm* — US Naval Research Laboratory; Joseph T. Grunkemeyer

(57) ABSTRACT

A method of: placing a mixture of zinc particles; water; a water-soluble thickener; and water-insoluble inorganic porogen particles into a mold; evaporating the water to form a monolith; heating the monolith to fuse the zinc particles together; and submerging the monolith in a liquid that removes the porogen particles. A method of: placing a mixture of zinc particles; an aqueous acetic acid solution; and porogen particles into a mold; evaporating water to form a monolith; and submerging the monolith in a liquid that removes the porogen particles.

12 Claims, 9 Drawing Sheets

(56) References Cited

U.S. PATENT DOCUMENTS

2018/0083276 A1*   3/2018   Khasin .................. H01M 4/244
2022/0344001 A1   10/2022   Dzakula

OTHER PUBLICATIONS

Chervin et al., ACS Appl. Energy Mater. 2020, 3, 10485-10494.
Floyd Jr. et al., J. Mater. Sci. (2020) 55:15117-15129.
Hopkins et al., Energy Storage Materials 27 (2020) 370-376.
Hopkins et al., Sustainable Energy Fuels, 2020,4, 3363-3369.
Hopkins et al., J. Vis. Exp. (163) e61770 (online video at https://www.jove.com/v/61770/) (2020).
Jayasayee et al., Processes 2020, 8, 592.
Ko et al., ACS Appl. Energy Mater. 2019, 2, 212-216.
Lee et al., Adv. Mater. 2017, 29, 1702665.
Parker et al., Science 356, 415-418 (2017).
Parker et al., J. Electrochem. Soc., 163 (3) A351-A355 (2016).
Parker et al., Environ. Sci., 2014, 7, 1117.
Parker et al., ACS Appl. Mater. Interfaces 2014, 6, 19471-19476.
Stock et al., ACS Appl. Mater. Interfaces 2018, 10, 8640-8648.
Stock et al., J. Power Sources 395 (2018) 195-204.
Stock et al., ACS Appl. Energy Mater. 2018, 1, 5579-5588.
Yan et al., RSC Adv., 2015, 5, 83781.
Yu et al., ACS Appl. Nano Mater. 2019, 2, 2679-2688.

* cited by examiner

US 11,710,818 B1

FABRICATION AND FUSION OF ZINC PARTICLES IN POROUS ELECTRODES

This application claims the benefit of U.S. Provisional Application No. 63/299,071, filed on Jan. 13, 2022. The provisional application and all other publications and patent documents referred to throughout this nonprovisional application are incorporated herein by reference.

TECHNICAL FIELD

The present disclosure is generally related to zinc electrodes for batteries.

DESCRIPTION OF RELATED ART

Zinc electrodes historically have had limited cycle life due to operando formation of dendrites that short-circuit the battery when they grow long enough to pierce the cell's separator and make electrical contact with the opposing electrode. A solution to this dendrite-forming problem is to fabricate the Zn anode as an aperiodic pore-solid architecture in which the 3D-interconnected void volume is co-continuous with the 3D-interconnected solid zinc network, i.e., a "sponge" form factor (Hopkins et al. (2020) *Sustain. Energy and Fuels* 4, 3363-3369; Hopkins et al. (2020) *Energy Storage Mater.* 27, 370-376; Hopkins et al. (2020) *J. Vis. Exp.* (163); Ko et al. (2018) *ACS Appl. Energy Mater.* 2, 212-216; Parker et al. (2017) *Science* 356, 415-418; Parker et al. (2016) *J. Electrochem. Soc.* 163, A351-A355; Parker et al. (2014) *Energy Environ. Sci.* 7, 1117-1124). The metallic, conductive, three-dimensional pathways improve current distribution throughout the electrode structure and avoid uneven reaction loci where formation of dendrites is likely to occur during charge-discharge cycles. In addition, the void network intertwined around the 3D zinc scaffold allows for confined volume elements with high ratios of surface (zinc) to volume (electrolyte); confinement induces saturation of zincate at lower concentrations than occurs in open solution; thus dehydration to zinc oxide (ZnO) occurs earlier in the discharge process, thereby further minimizing shape change.

These previous Zn-sponge fabrication protocols used emulsion-based compositions that required organic pore-forming agents (carboxymethyl cellulose (CMC) or cornstarch). After drying and consolidation of the zinc-porogen object and subsequent thermal processing under inert gas flow (nitrogen or argon), the organic porogen must then be removed by heating in an oxygen-containing environment, typically air, causing excess oxidation of zinc to zinc oxide. The entire process is conducted in a furnace and takes ~10 hours for tube purging, thermal ramping, and cooling.

BRIEF SUMMARY

Disclosed herein is a method comprising: providing a mixture comprising particles comprising zinc; water; a water-soluble thickener; and water-insoluble inorganic porogen particles, placing the mixture into a mold; evaporating the water from the mixture to form a monolith; heating the monolith to fuse the zinc particles together; and submerging the monolith in a liquid that removes the porogen particles.

Also disclosed herein is a method comprising: providing a mixture comprising: particles comprising zinc; an aqueous acetic acid solution; and porogen particles; placing the mixture into a mold; evaporating water from the mixture to form a monolith; and submerging the monolith in a liquid that removes the porogen particles.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
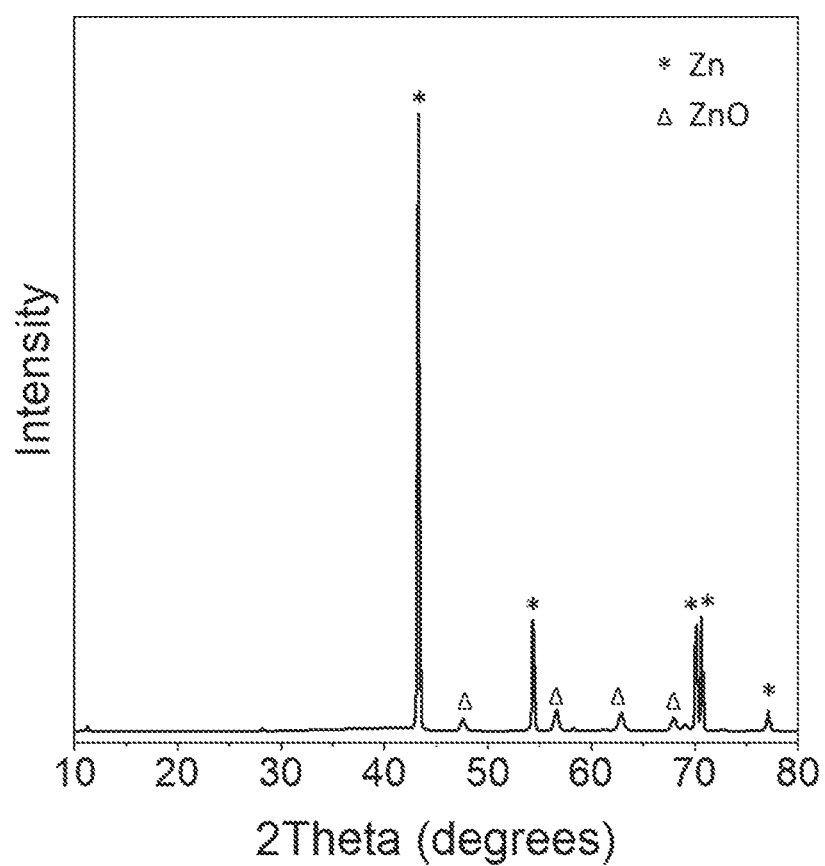
FIG. 1 shows X-ray diffraction (XRD) pattern of zinc monolith (Method 1) after thermal treatment (580° C., 1 h) and 10 min washing in 1M HCl.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted to not obscure the present disclosure with unnecessary detail.

Herein, is disclosed a synthesis method that utilizes a thermally stable, inorganic pore-former to create the interconnected zinc architecture. The inorganic porogen is removed chemically after a simplified thermal treatment at lower temperatures. The incorporation of a thermally stable inorganic porogen significantly reduces the heat-treatment time and synthesis cost. In a second variation, synthesis cost and time are reduced by chemically sintering zinc particles together into a monolithic object, thereby minimizing or eliminating the need for additional thermal treatment.

In a first method, a mixture is made of particles comprising zinc, water, a water-soluble thickener, and inorganic porogen particles. The zinc particles may be, for example, any that are described in U.S. Pat. Nos. 9,802,254; 10,008,711; 10,720,635; 10,763,500; 10,804,535; 11,069,889; and 11,296,373.

The water-soluble thickener may be, for example, a carboxymethylcellulose. The porogen particles are water-insoluble, and may comprise, for example, calcium carbonate, magnesium carbonate, and magnesium oxide. The porogen may be thermally stable in air up to 600° C., and be easily removable post-thermal processing.

Next, the mixture is placed in a mold and the water evaporated to form a monolith. The monolith is then heated to fuse the zinc particles together. The heating step may, for example, be performed by heating at no more than 600° C. for no more than 2 hours.

After heating, the monolith is submerged in a liquid that removes the porogen particles. The liquid may be, for example, aqueous hydrochloric acid for removing calcium carbonate particles.

In a second method, the zinc particles are mixed with an aqueous acetic acid solution and porogen particles. Acetic-acid treatment of the zinc powder can happen before, during, and/or after mixing with the appropriate porogen for chemical sintering. The porogen particles may comprise, for example, zinc acetate dihydrate, a halide salt (NaCl, KCl, etc.), urea, calcium carbonate, or other highly water-soluble compounds.

As above, the mixture is placed in a mold and the water evaporated to form a monolith. The heating step is not necessary to fuse the zinc particles, due to the acetic acid and zinc acetate dihydrate. The monolith is then submerged in a liquid that removes the porogen particles. The liquid may be, for example, water, ethanol, or aqueous hydrochloric acid. Optionally, the monolith is then heated at a temperature below the melting point of zinc.

Other variations and parameters of these methods may be incorporated from those disclosed in U.S. Pat. Nos. 9,802,254; 10,008,711; 10,720,635; 10,763,500; 10,804,535; 11,069,889; and 11,296,373.

An aspect of this synthetic protocol is the use of $CaCO_3$ as an inorganic porogen to fabricate porous zinc electrodes. Calcium carbonate is used because of its thermal stability and high solubility in aqueous acid—the former permits taking zinc above its melting point while the thermally recalcitrant $CaCO_3$ retains the form factor and the latter allows facile removal after thermal processing. Previous generations of zinc-sponge fabrication methods in the art use organic porogens, which must be removed with high-temperature oxidative treatment. In those prior examples, once those porogens are removed, only air remains to diffuse heat into the zinc structure, a condition that may lead to inhomogeneous internal heating of the zinc object. Because the thermal conductivity of $CaCO_3$ (2.25 W/mK) is ~100× greater than that of air (0.025 W/mK), having $CaCO_3$ infused in the voids of the zinc monolith throughout the thermal processing disperses heat more uniformly within the zinc object to enhance the fusion of individual zinc particles into a mechanically cohesive network. The result is a zinc sponge that is equal to or greater than one derived from organic porogen-based methods in terms of mechanical strength, integrity, and handleability, while also employing simpler and shorter thermal processing steps. In addition, the use of hydrochloric acid (HCl) to remove $CaCO_3$ after thermal treatment also dissolves some surface ZnO that forms during heating. For some zinc rechargeable battery configurations (Ag—Zn, Zn-air, Zn—$MnO_2$), it is desirable that the sponge have relatively low ZnO content when first incorporated into the battery.

The following examples are given to illustrate specific applications. These specific examples are not intended to limit the scope of the disclosure in this application.

Method 1: Inorganic Template Plus One-Step Thermal Treatment in Air

In one embodiment, 8 mL of 18 MΩ·cm water is mixed with 80 mg of high viscosity CMC thickener (Sigma Aldrich, C5013). Separately, 3.0 g of calcium carbonate (CaCO3) is dry-mixed with 65 g of 50 μm zinc (Zn) powder. After achieving uniform mixtures, the dry powders are mixed into the CMC-thickened water solution until homogenous. The viscous paste is then molded into the desired shape and dried overnight at 50-70° C. For zinc particle fusion, the dried monoliths are placed in an alumina crucible and then into a preheated box furnace set to 580° C. for 1 h. After this period, the samples are removed from the furnace to cool to room temperature. In order to remove the $CaCO_3$ porogen, the heat-treated, Zn monoliths are submerged in 1 M HCl for 5-10 min and then rinsed with copious amounts of water followed by ethanol. After thermal treatment and acid washing, the zinc architectures comprise ~85% metallic zinc and ~15% zinc oxide (ZnO) by weight, according to Reference Intensity Ratio (RIR) fitting of XRD patterns (FIG. 1).

Figure 2:
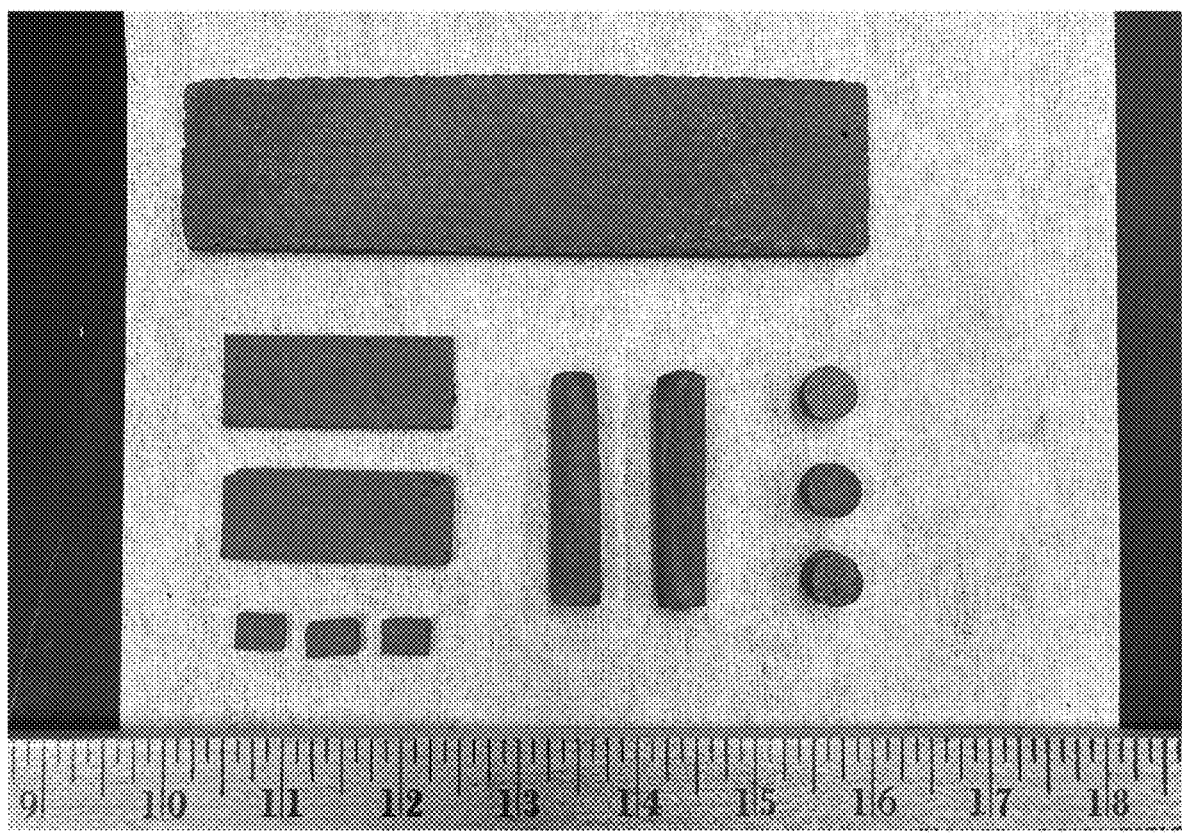
FIG. 2 shows a photograph of Zn sponge monoliths fabricated using an inorganic porogen (Method 1) as molded into different form factors.
Figure 3:
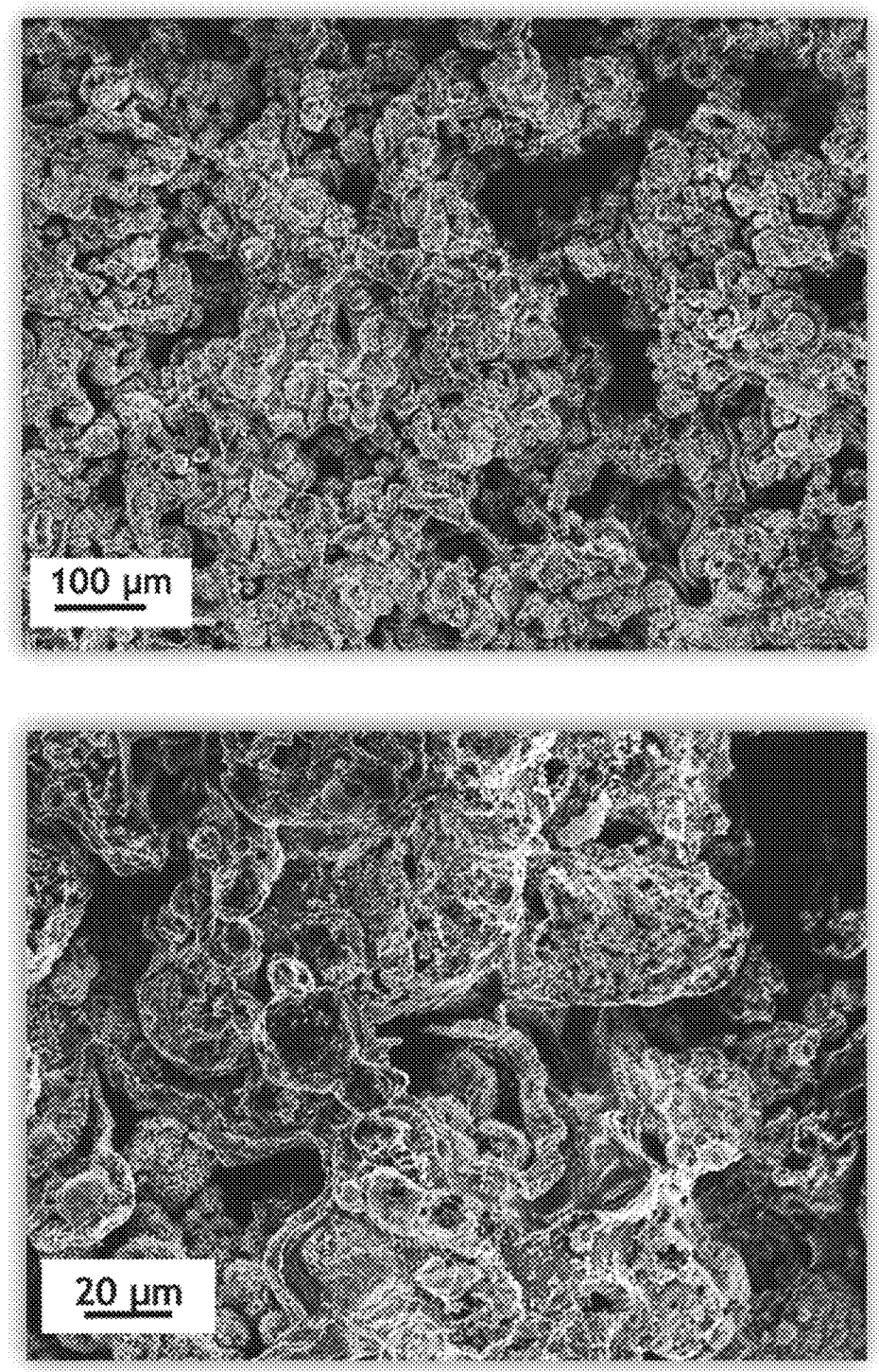
FIG. 3 shows scanning electron micrographs of zinc monoliths synthesized by Method 1. The micrographs show internal surfaces that were exposed by removing slices from rod-shaped zinc monoliths.

The ultimate form factor of the final monolith derives primarily from the dimensions of the initial mold used to contain the viscous paste derived from the Zn sponge precursors; various examples prepared in our laboratory are shown in FIG. 2. Scanning electron micrographs (FIG. 3) of cross-sectional cuts depict well-fused and interconnected zinc particles.

Figure 4:
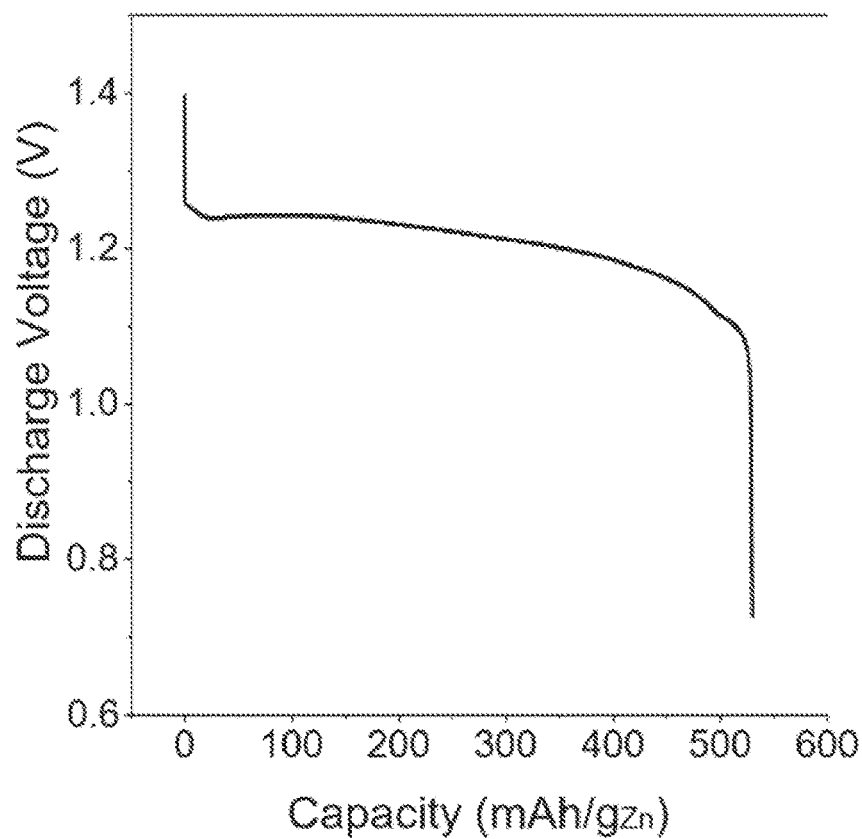
FIG. 4 shows primary discharge of zinc electrode in a Zn-air cell. Cathode: 4:1:1 mixture acetylene black carbon: cryptomelane MnOx aerogel catalyst: PTFE binder; anode: zinc sponge electrode fabricated according to Method 1; electrolyte: 9 M KOH; separators: Freudenberg non-woven, Celgard 3501. Discharged at 10 mA cm$^{-2}$.
Figure 5:
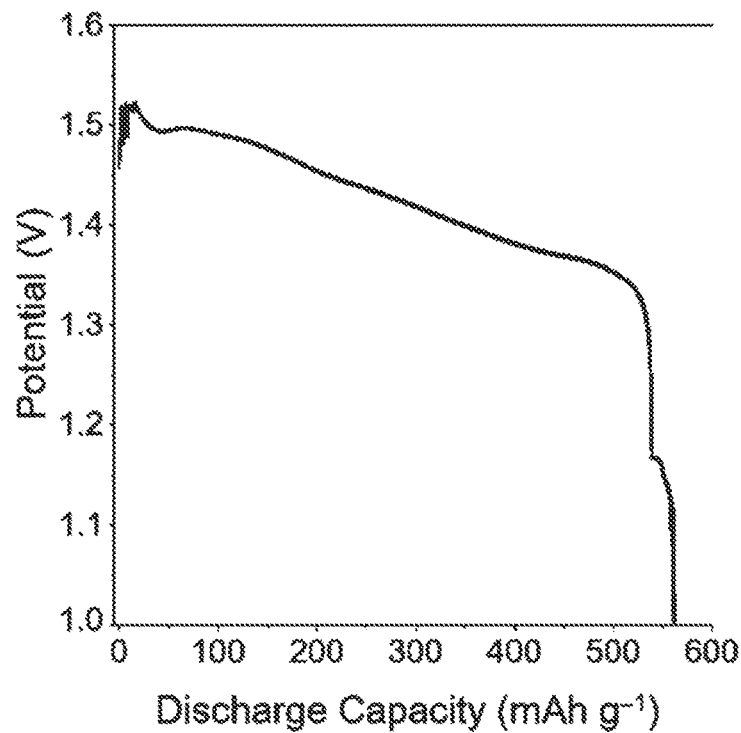
FIG. 5 shows primary discharge of zinc electrode in an Ag—Zn cell. Cathode: Silver oxide (primarily AgO); anode: zinc sponge electrode fabricated according to Method 1; electrolyte: 9 M KOH; separators: 2× cellophane, Freudenberg non-woven, Celgard 3501. Discharged at 10 mA cm$^{-2}$.
Figure 6:
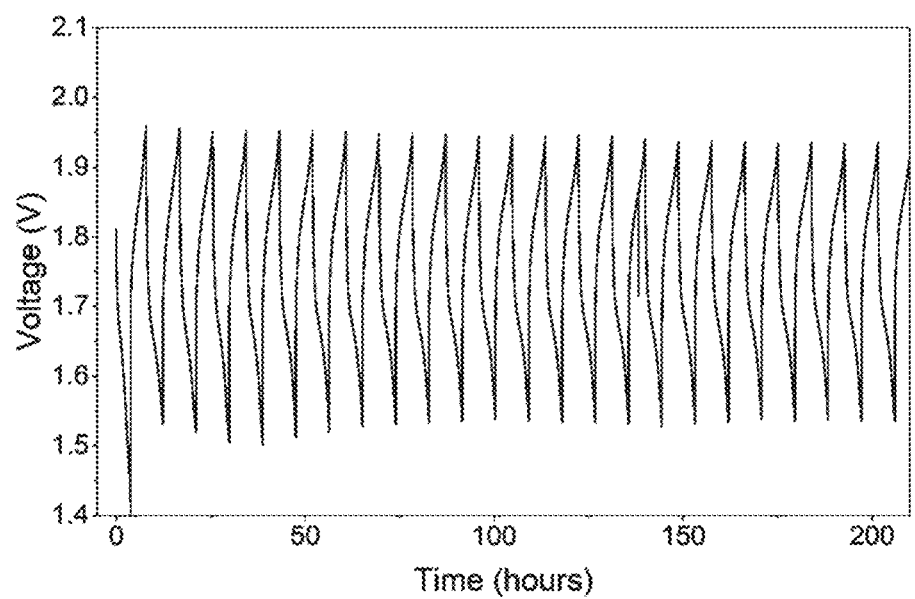
FIG. 6 shows discharge capacity retention as a function of cycle for a Ni—Zn cell. Cathode: Harvested NiOOH from a commercial Ni—Zn battery (PK cell); anode: zinc sponge electrode fabricated according to Method 1; electrolyte: 6 M KOH, 1 M LiOH; separators: Freudenberg non-woven, Celgard 3501. Discharged at 10 mA cm$^{-2}$. Areal current density defined by the geometric area of the zinc sponge electrode.
Figure 7:
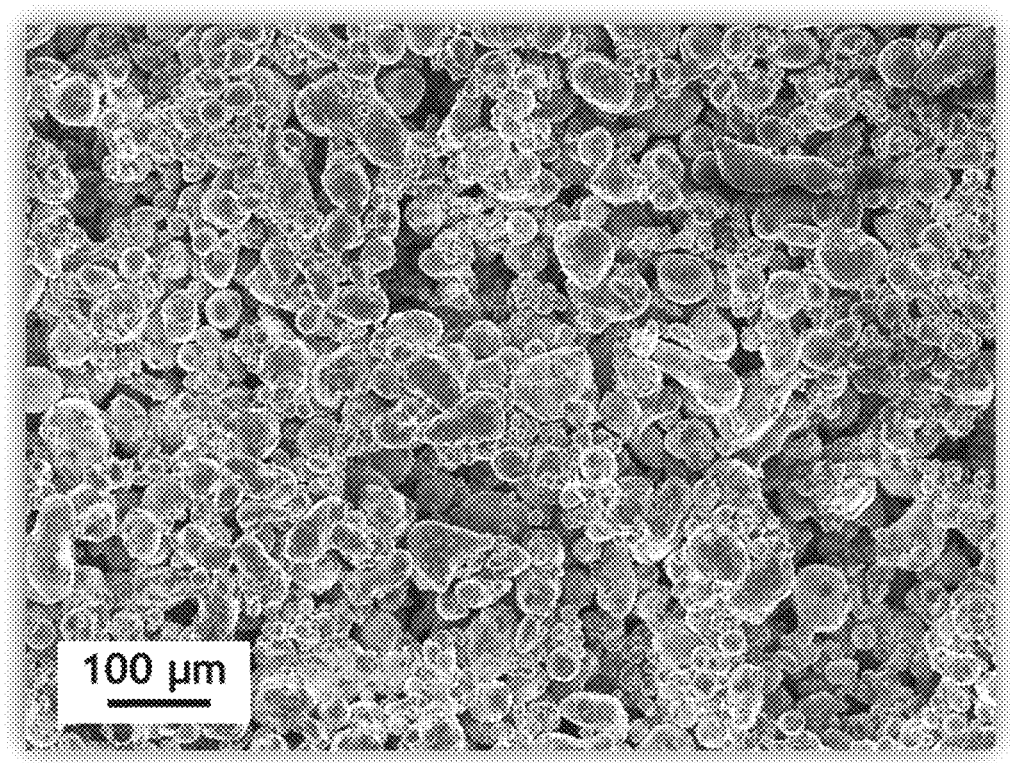
FIG. 7 shows a scanning electron micrograph of a chemically sintered zinc electrode (fabricated according to Method 2). The micrograph shows an internal surfaces exposed by removing a slice from a rod-shaped zinc monolith. Magnification: 250×.
Figure 8:
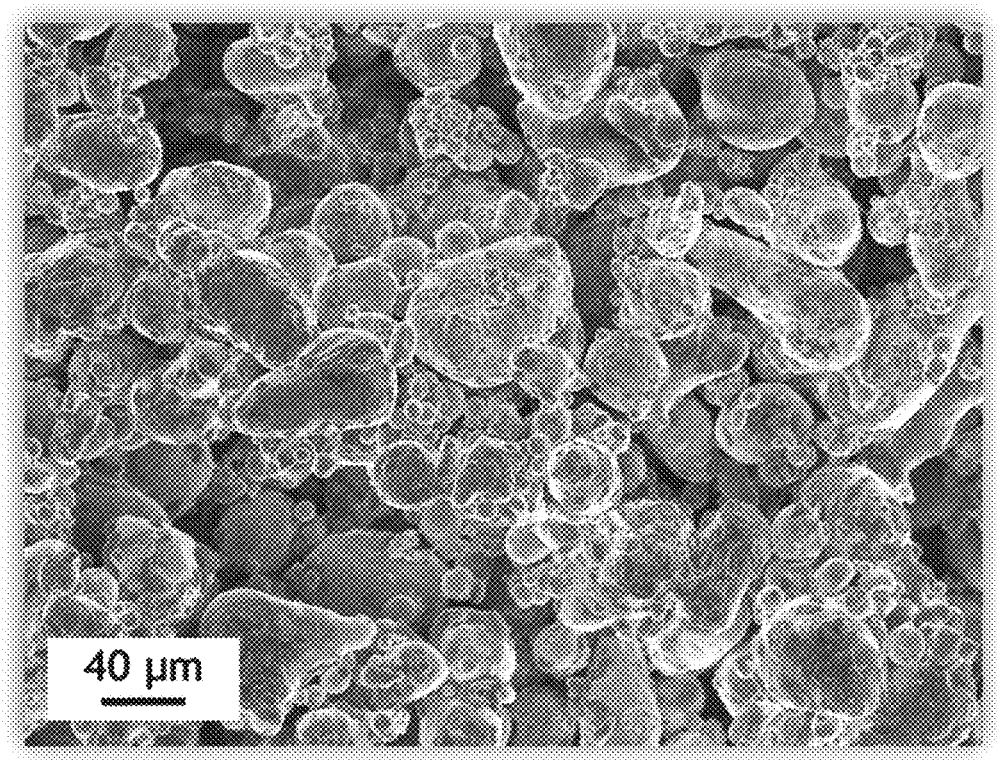
FIG. 8 shows a scanning electron micrograph of a chemically sintered zinc electrode (fabricated according to Method 2). The micrograph shows an internal surfaces exposed by removing a slice from a rod-shaped zinc monolith. Magnification: 500×.
Figure 9:
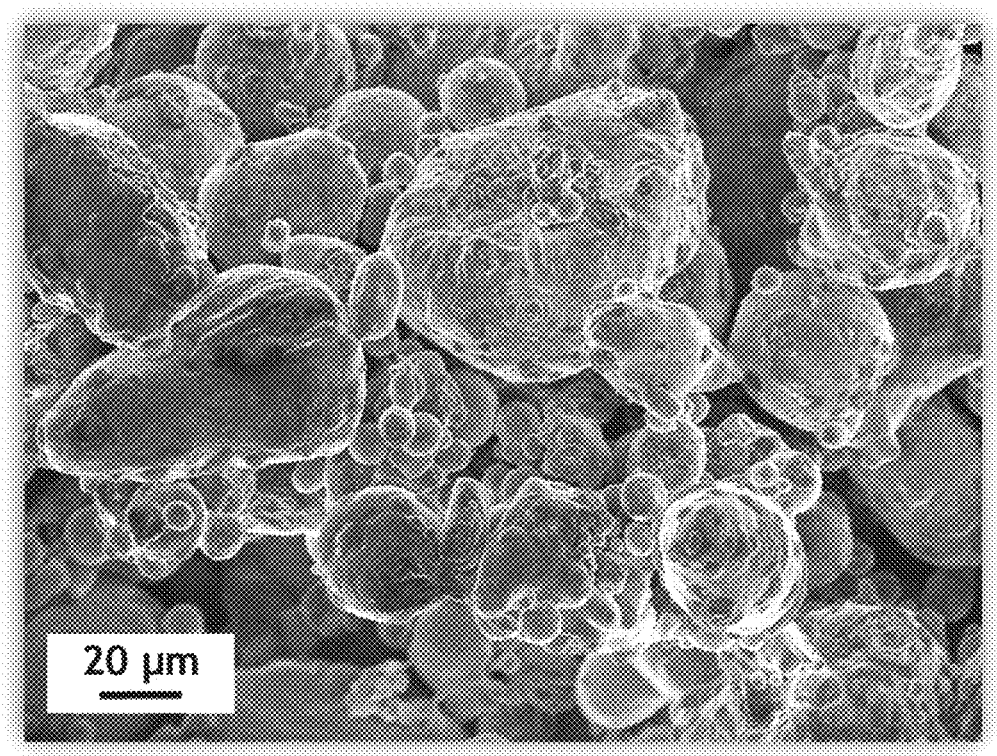
FIG. 9 shows a scanning electron micrograph of a chemically sintered zinc electrode (fabricated according to Method 2). The micrograph shows an internal surfaces exposed by removing a slice from a rod-shaped zinc monolith. Magnification: 1000×.
Figure 10:
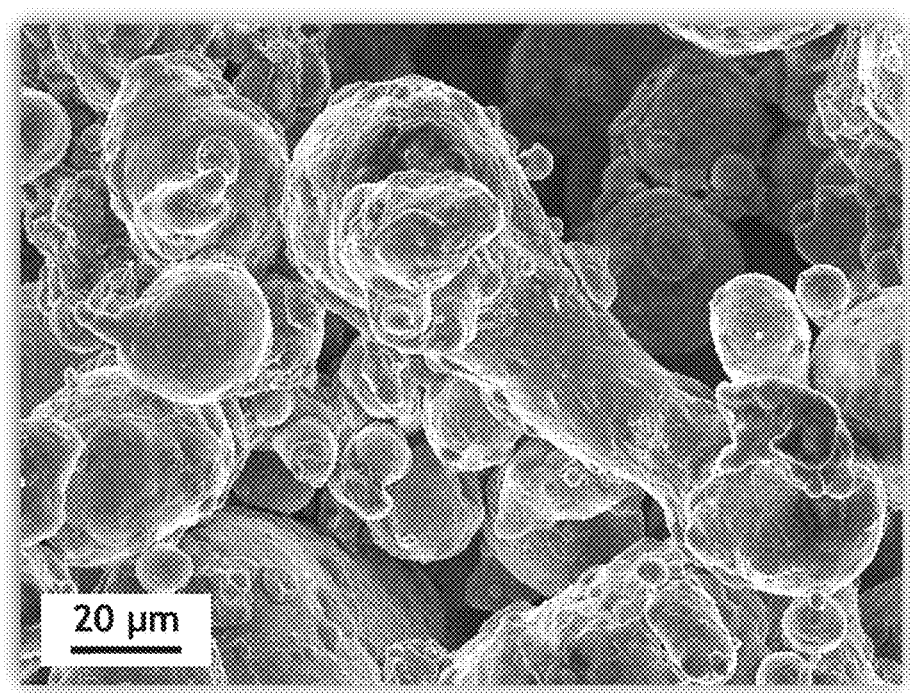
FIG. 10 shows a scanning electron micrograph of a chemically sintered zinc electrode (fabricated according to Method 2). The micrograph shows an internal surfaces exposed by removing a slice from a rod-shaped zinc monolith. Magnification: 1500×.

Electrochemical testing of the disclosed Zn monoliths demonstrates high discharge capacity (in Zn-air and silver-zinc (Ag—Zn) cells) and rechargeability (in nickel-zinc (Ni—Zn) cells). In primary discharge tests (FIGS. 4, 5), the achievable capacity is determined to be 500-550 mAh g$^{-1}$, which is 60-68% of theoretical zinc discharge capacity. While a promising capacity compared to conventional zinc electrodes, these results suggest that some ZnO remains, limiting available zinc metal for extreme high-energy battery discharge. Prototype Ni—Zn cells utilizing Zn anodes from the disclosed method and harvested NiOOH cathodes from commercial cells demonstrate rechargeability and capacity retention at 20% depth of discharge (DOD) (FIG. 6) over 25 cycles at 100% coulombic efficiency.

Method 2: Inorganic Template with Chemical Fusion of Zinc Particles

Disclosed is a sintering strategy that chemically, rather than thermally, fuses zinc particles together into a 3D network. This process involves introducing acetic acid to the zinc fabrication protocol, either before or after mixing with appropriate porogens. When exposed to acetic acid, the native, adventitious surface oxide of the zinc powder dissolves and initiates a self-exchange mechanism with the zinc metal surfaces (Yan et al. (2015) RSC Adv. 5, 83781-83797; Stock et al. (2018) ACS Appl. Energy Mater. 1, 5579-5588). This process removes ZnO as $Zn^{2+}$ and redeposits those species as Zn metal, often at junctions where Zn particles meet, thereby bridging those particles together.

Figure 11:
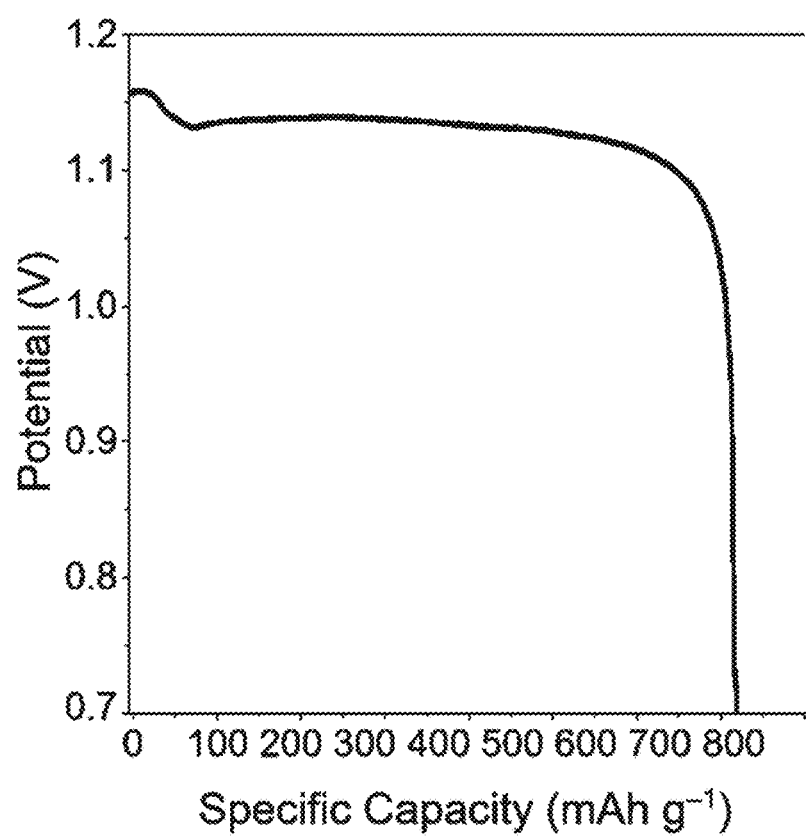
FIG. 11 shows primary discharge of zinc electrode in a Zn-air cell. Cathode: 4:1:1 mixture acetylene black carbon: cryptomelane MnOx aerogel catalyst: PTFE binder; anode: zinc sponge electrode fabricated according to Method 2; electrolyte: 9 M KOH; separators: Freudenberg non-woven, Celgard 3501. Discharged at 10 mA cm$^{-2}$.

In one embodiment, 28 g of Zn powder is mixed with 5 g of zinc acetate dihydrate. After homogenization, 3 mL of 5% acetic acid is added. After achieving a uniform mixture, the viscous paste is molded into the desired shape and dried overnight at 50-70° C. To remove the zinc acetate, zinc monoliths are soaked in water or ethanol for 2 h between room temperature and 60° C. Vacuum may be utilized to exfiltrate zinc acetate out of large-form monoliths. The acetic-acid treatment is sufficient to fuse zinc particles (FIGS. 7-10) and form monoliths that can be electrochemically discharged in Zn—air cells (FIG. 11).

In another embodiment, 27 g of Zn powder is mixed with 2 mL of 5% acetic acid and mixed thoroughly. The zinc powder is then filtered using a vacuum flask and washed with ethanol. Five grams of finely ground zinc acetate dihydrate is then mixed with the zinc powder. In a separate beaker, 4 mL of water and 50 mg of high-viscosity CMC (Sigma Aldrich, C5013) are mixed. After achieving uniform mixtures, the dry powders are mixed into the CMC-thickened water solution until homogenous. The viscous paste is then molded into the desired shape and dried overnight at 50-70° C. To remove the zinc acetate, zinc monoliths are soaked in water or ethanol for 2 h between room temperature and 60° C. Vacuum infiltration may be utilized to dissolve zinc acetate out of large-form monoliths.

In another embodiment, $CaCO_3$ porogen is used in conjunction with both chemical and thermal sintering. This process includes pretreating the zinc powder with acetic acid, mixing with calcium carbonate porogen, and then heat treating in an atmosphere of flowing inert gas (e.g., nitrogen or argon) at a lower temperature than the melting point of zinc (such as 400° C.) for a short period of time (e.g., 0.5-2 h). It has been found that the acetic-acid treatment of zinc allows for sufficient softening of the zinc below its melting point (419° C.). In contrast, zinc without acetic acid treatment needs to be heated to nearly 600° C. to form structurally sound monoliths.

Figure 12:
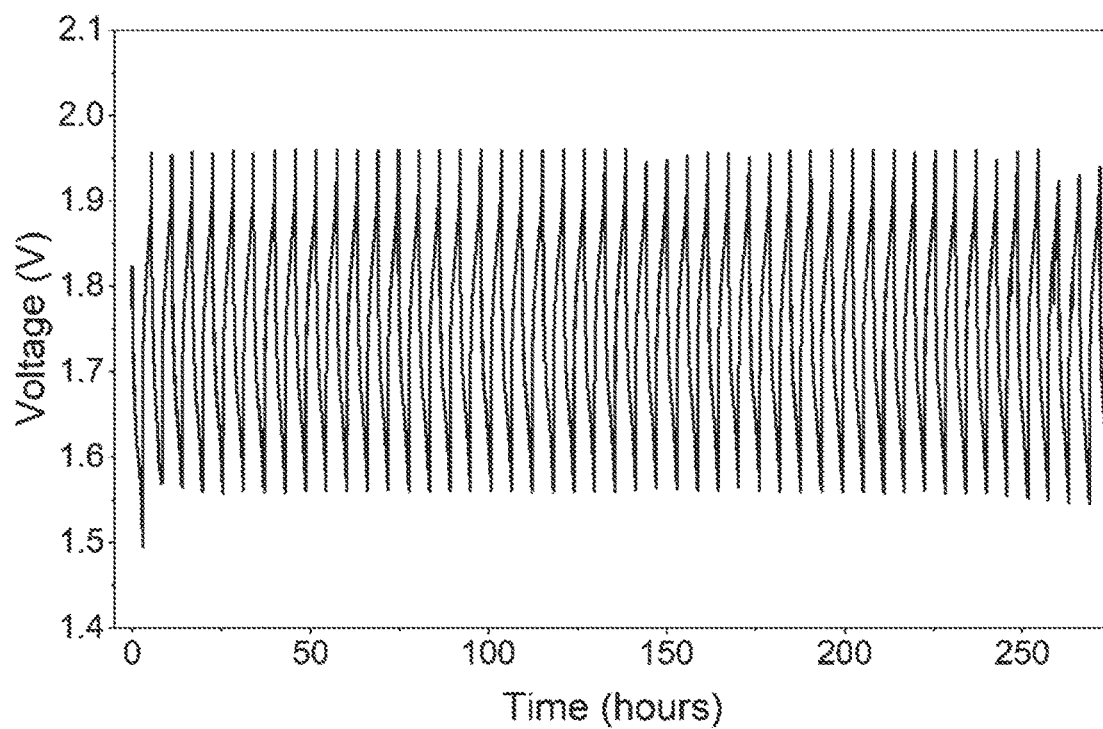
FIG. 12 shows discharge capacity retention as a function of cycle for a Ni—Zn cell. Cathode: Harvested NiOOH from a commercial Ni—Zn battery (PK cell); anode: zinc sponge electrode fabricated according to Method 2 before zinc acetate removal; electrolyte: 6 M KOH, 1 M LiOH; separators: Freudenberg non-woven, Celgard 3501. Discharged at 10 mA cm$^{-2}$. Areal current density defined by the geometric area of the zinc sponge electrode.
Figure 13:
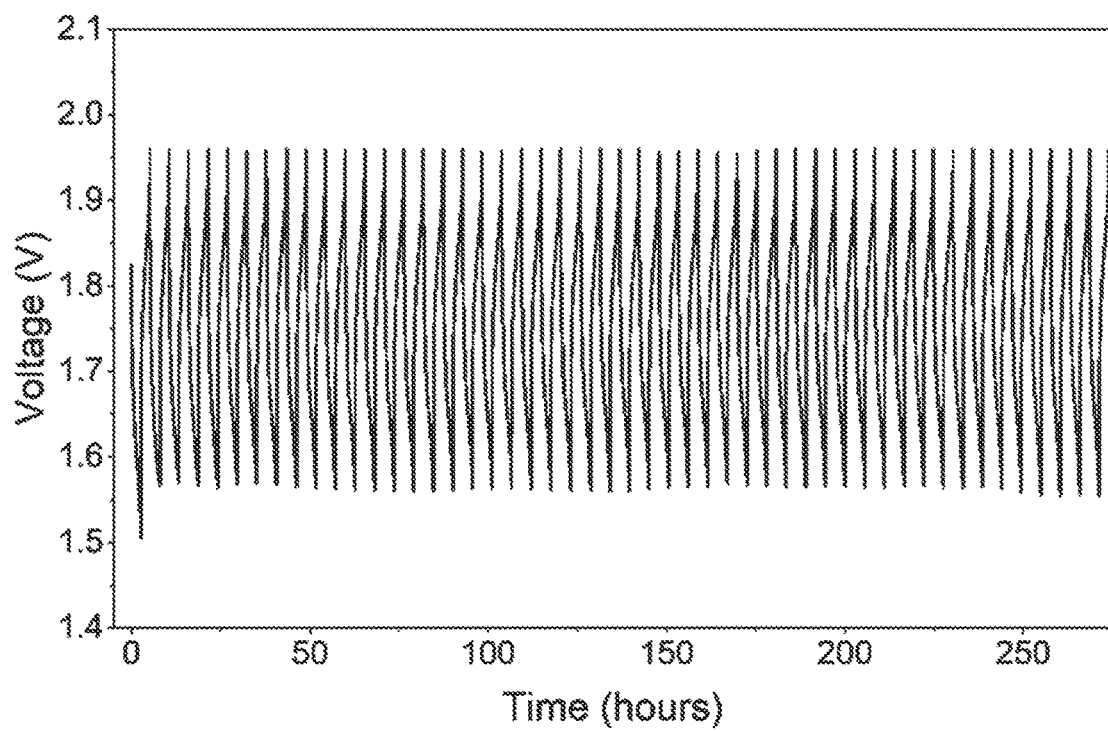
FIG. 13 shows discharge capacity retention as a function of cycle for a Ni—Zn cell. Cathode: Harvested NiOOH from a commercial Ni—Zn battery (PK cell); anode: zinc sponge electrode fabricated according to Method 2 after zinc acetate removal; electrolyte: 6 M KOH, 1 M LiOH; separators: Freudenberg non-woven, Celgard 3501. Discharged at 10 mA cm$^{-2}$. Areal current density defined by the geometric area of the zinc sponge electrode.

Prototype cells utilizing zinc anodes (Method 2) and NiOOH cathodes harvested from commercial cells demonstrate impressive rechargeability and capacity retention at 20% DOD. If zinc acetate porogen is not removed before cell construction, 50 cycles are obtained at 100% efficiency before performance decay (FIG. 12). In contrast, if zinc acetate is removed by washing with water before cell construction, significantly prolonged and improved performance is observed (FIG. 13). The cell used for FIG. 13 ran for >150 cycles before coulombic efficiency dropped below 100%, and lasted >200 cycles and 2 months in cell before dropping below 85%.

Figure 14:
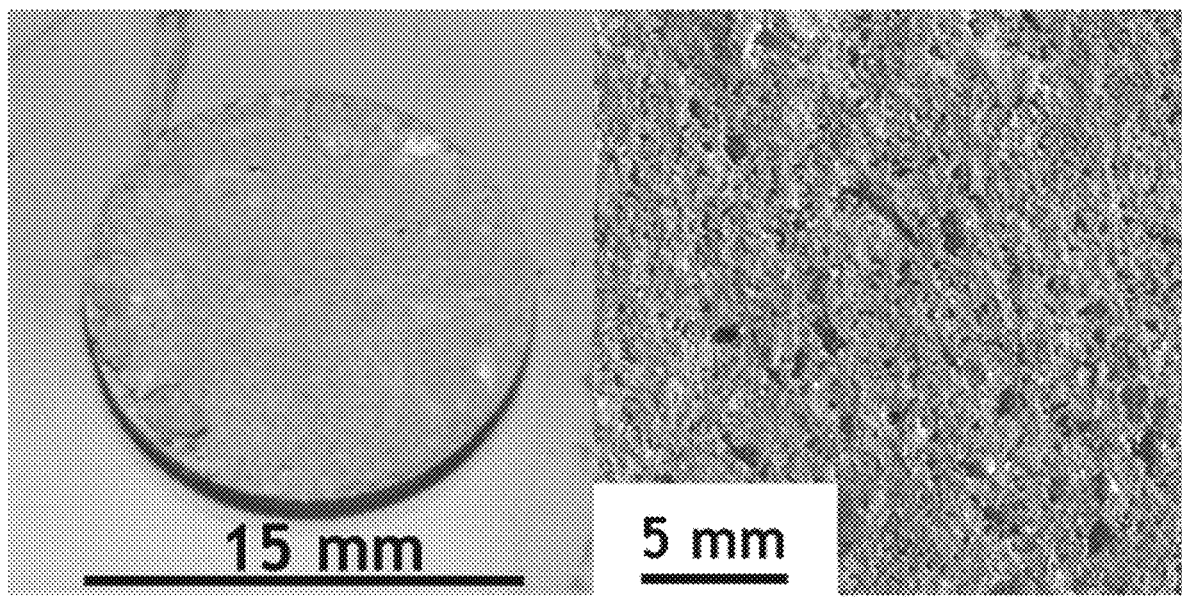
FIG. 14 shows photographs of a silver sponge electrode.
Figure 15:
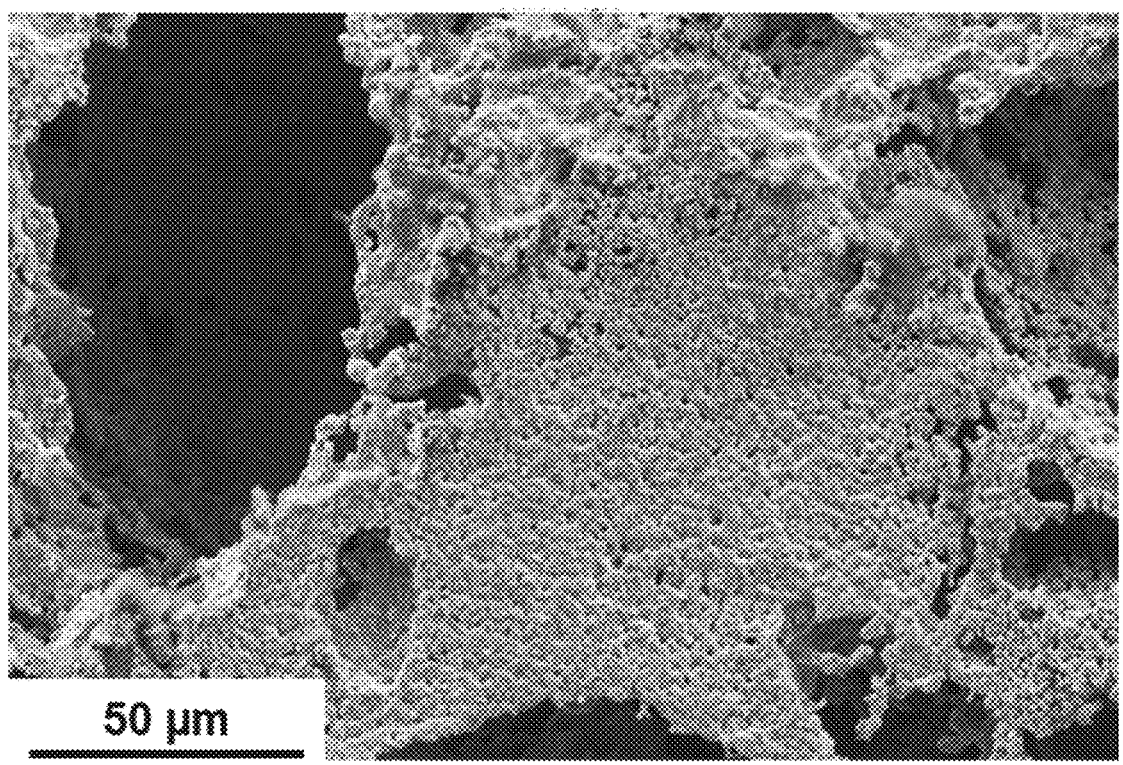
FIG. 15 shows a scanning electron micrograph of the internal silver sponge surfaces.

The methods described herein and in U.S. Pat. Nos. 9,802,254; 10,008,711; 10,720,635; 10,763,500; 10,804,535; 11,069,889; and 11,296,373 can be applied to metals other than zinc for fabrication of porous, interconnected monoliths relevant to aqueous batteries. Silver is commonly employed as a high-rate cathode in conjunction with a zinc anode and can be manufactured using these methods. For example, 200 mg of silver (I) oxide (Ag2O) is thoroughly mixed with 100 mg of NaCl and pressed into a pellet of 15 mm diameter using a hydraulic press at 3 tons. After pelletization, the object is placed into a 700° C. ambient air furnace for 30 minutes to convert the silver oxide into silver metal while simultaneously fusing the silver particles together. After cooling, the pellet is washed thoroughly with warm 70° C. water to remove the NaCl porogen resulting in a fully metallic silver sponge electrode (FIGS. 14, 15).

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   providing a mixture comprising:
      particles comprising zinc;
      water;
      a water-soluble thickener; and
      inorganic porogen particles;
         wherein the porogen particles are water-insoluble;
   placing the mixture into a mold;
   evaporating the water from the mixture to form a monolith;
   heating the monolith to fuse the zinc particles together; and
   submerging the monolith in a liquid that removes the porogen particles.

2. The method of claim 1, wherein the water-soluble thickener is a carboxymethylcellulose.

3. The method of claim 1, wherein the porogen particles comprise calcium carbonate.

4. The method of claim 3, wherein the liquid is aqueous hydrochloric acid.

5. The method of claim 1, wherein heating the monolith is performed at no more than 600° C. for no more than 2 hours.

6. A method comprising:
   providing a mixture comprising:
      particles comprising zinc;
      an aqueous acetic acid solution; and
      porogen particles;
   placing the mixture into a mold;

evaporating water from the mixture to form a monolith; and submerging the monolith in a liquid that removes the porogen particles.

7. The method of claim 6, wherein the porogen particles comprise zinc acetate dihydrate.

8. The method of claim 6, wherein the porogen particles comprise a halide salt or urea.

9. The method of claim 6, wherein the liquid is water or ethanol.

10. The method of claim 6, wherein the porogen particles comprise calcium carbonate.

11. The method of claim 10, wherein the liquid is aqueous hydrochloric acid.

12. The method of claim 10, further comprising:

heating the monolith at a temperature below the melting point of zinc.

* * * * *